(12) United States Patent
Yi et al.

(10) Patent No.: US 7,860,762 B2
(45) Date of Patent: Dec. 28, 2010

(54) CHARGING SYSTEM AND CHARGING METHOD

(75) Inventors: Zhiquan Yi, Shenzhen (CN); Wei Zhang, Shenzhen (CN); Fei Zhang, Shenzhen (CN)

(73) Assignee: Huawei Technologies Co., Ltd., Shenzhen, Guangdong ( * ) Notice: Subject to any disclaimer, the term of this patent is extended or adjusted under 35 U.S.C. 154(b) by 64 days.

(21) Appl. No.: 12/199,662

(22) Filed: Aug. 27, 2008

(65) Prior Publication Data

US 2008/0319884 A1 Dec. 25, 2008

Related U.S. Application Data

(63) Continuation of application No. PCT/CN2007/000620, filed on Feb. 27, 2007.

(30) Foreign Application Priority Data

Feb. 27, 2006 (CN) .................. 2006 1 0057773

(51) Int. Cl.
*G07B 17/00* (2006.01)
*G07F 19/00* (2006.01)

(52) U.S. Cl. ............. 705/30; 379/114.22; 379/126; 370/338; 370/230

(58) Field of Classification Search .............. None
See application file for complete search history.

(56) References Cited

U.S. PATENT DOCUMENTS

| | | |
|---|---|---|
| 2003/0023550 A1 | 1/2003 | Lee |
| 2003/0069840 A1 | 4/2003 | Ung |
| 2003/0133552 A1 | 7/2003 | Pillai et al. |
| 2005/0009500 A1 | 1/2005 | Ear |
| 2006/0153074 A1* | 7/2006 | Hurtta et al. ............... 370/230 |
| 2007/0036312 A1* | 2/2007 | Cai et al. ............... 379/126 |
| 2007/0041536 A1* | 2/2007 | Koskinen et al. ....... 379/114.28 |

FOREIGN PATENT DOCUMENTS

| | | |
|---|---|---|
| CN | 1397125 A | 2/2003 |
| CN | 1859533 A | 11/2006 |
| EP | 1492321 A1 | 12/2004 |
| KR | 20050114520 A | 12/2005 |
| WO | WO 2005/109758 A1 | 11/2005 |

OTHER PUBLICATIONS

3rd Generation Partnership Project (3GPP TS 32.240 V6.0.0 (Sep. 2004).*
European Patent Office, Extended European Search Report in European Patent Application No. 07720273.7 (Feb. 8, 2010).
State Intellectual Property Office of the People's Republic of China, English Translation of Written Opinion of the International Searching Authority in International Patent Application No. PCT/CN2007/000620 (Jun. 21, 2007).
Global System for Mobile Communications (GSM), 3rd Generation Partnership Project; Technical Specification Group Services and System Aspects; Policy and Charging Control Architecture (Release 7), 3GPP TS 23.203 V0.4.0 (Feb. 2006).

* cited by examiner

*Primary Examiner*—F. Zeender
*Assistant Examiner*—Luna Champagne
(74) *Attorney, Agent, or Firm*—Leydig, Voit & Mayer, Ltd.

(57) ABSTRACT

The present invention provides a charging system and charging method. An online charging system and an offline charging system are interconnected via a shared data center to make up a dual-engine structure, which is able to implement online charging, offline charging, account sharing, switching between prepaid and postpaid modes, and binding of voice and data services. With the invention, an operator can possess more flexible charging and control capabilities, lower the cost of arrearage, and have stronger competitiveness.

10 Claims, 8 Drawing Sheets

CHARGING SYSTEM AND CHARGING METHOD

CROSS-REFERENCE TO RELATED APPLICATION

This application is a continuation of International Patent Application No. PCT/CN2007/000620, filed Feb. 27, 2007, which claims priority to Chinese Patent Application No. 200610057773.9, filed Feb. 27, 2006, each of which is hereby incorporated by reference in its entirety.

FIELD OF THE INVENTION

The present invention relates to network communication technologies and, in particular, to a charging system and charging method.

BACKGROUND OF THE INVENTION

With the progress of telecommunication and information technology (IT) services, charging methods become flexible and diversified. All kinds of charging systems are widely used in telecommunication and IT services. In the traditional charging mode of an operator, online charging and control are implemented for prepaid users in real time through the intelligent network (IN), and the Business Operation Support System (BOSS) or hot billing system is adopted to perform offline charging for postpaid users. Online charging is a charging mechanism in which charging information may impact the provisioning of services, and the account balance is updated in real time. Therefore, in online charging, the charging process is part of the service flow and the charging mechanism interacts with session/service control directly. Offline charging is a charging mechanism in which charging information does not impact the provisioning of services in real time. Offline charging is a traditional "use before charging" method. After a user finishes using a service, the user is charged according to the generated call detail record (CDR).

FIG. 1 shows the structure of a charging system in the related art.

In the charging system, offline charging is implemented by a hot billing system. Hot billing is a type of offline charging. After obtaining the CDR in the online mode, the hot billing system charges the user immediately to minimize the time difference between service use and charging. As shown in FIG. 1, a hot billing system 112 collects CDRs from a Mobile Switching Centre (MSC) 111 in the circuit switched (CS) domain 11, Charging Gateway (CG) 123 in the packet switched (PS) domain 12, and Mobile Data Service Management Platform (MDSP) 131 in the service layer 13, and then charges users.

In the charging system, online charging is implemented by a hot billing system. The hot billing system in FIG. 1 includes a Service Control Point (SCP) 113 and a MDSP 131. The online charging for CS services is implemented by an IN. A Mobile Switching Centre/Service Switching Point (MSC/SSP) 111 is connected to the SCP 113, where account information of all users requiring online charging is stored, which enables billing for voice and point-to-point short message services in real time. The charging for bearer traffic in the PS domain 12 is implemented through an interface between the Serving GPRS Supporting Node (SGSN) 121 and the SCP 113; for content charging, the MDSP 131 completes ratings and interfaces with the SCP 113 to make real-time reservations and deductions.

The offline charging method based on the charging system in FIG. 1 includes the following steps:

1. A user uses a CS or PS domain service;
2. After the user finishes using the service, a related device (MSC in the CS domain, CG in the PS domain, or MDSP) generates a CDR;
3. The hot billing system collects the CDR from the related device (MSC in the CS domain, CG in the PS domain, or MDSP);
4. The hot billing system charges the user and performs appropriate actions on the user account.

The online charging method based on the charging system in FIG. 1 includes the following steps:

1. A user uses a CS or PS domain service;
2. When the use is using the service, a related device (MSC in the CS domain, SGSN/SSP in the PS domain or MDSP) interacts with the SCP in real time: in the case of a MSC or SGSN/SSP, the MSC or SGSN/SSP reports the usage information (such as traffic volume and duration) in real time and the SCP performs ratings, deductions and reservations; in the case of a MDSP, the MDSP rates the contents according to the usage information and requests the SCP to make deductions;
3. After the user finishes using the service, the related device (MSC in the CS domain, SGSN/SSP in the PS domain or MDSP) reports usage information to the SCP (the MDSP reports charges directly), and the SCP makes deductions and returns a deduction acknowledgement message to the related device.

In the charging system in FIG. 1, the SCP is on the network side and completes service control, so it must be reliable and stable; the charging function is implemented by the BOSS and requires high flexibility. The flexibility of the charging function requires frequent upgrades of the SCP, which will impact the reliability and stability of the SCP. Moreover, because pre-payment and post-payment are implemented in the IN and hot billing system, respectively, and the rating points of prepaid data and prepaid voices are different, it is hard to implement the switch between the prepaid and postpaid modes. In addition, for the voice domain, rating and charging are implemented in an IN; but for the data domain, rating and charging are implemented by the MDSP and deductions are made in the IN. Hence, it is hard to bind voice and data services, and the flexibility of service prices is not enough.

FIG. 2 shows the structure of another charging system in the related art. In the charging system in FIG. 2, the hot billing system 112 processes all billing actions uniformly. The component is single and the construction cost is low. But the billing actions are not real-time and the deduction period is long, so it is impossible to enable real-time service control. The SCP 113 and MDSP 131 no longer belong to the hot billing system, and between them, there is no deduction interface.

The offline charging method based on the charging system in FIG. 2 includes the following steps:

1. A user uses a CS or PS domain service;
2. After the user finishes using the service, a related device (MSC in the CS domain, CG in the PS domain, or MDSP) generates a CDR;
3. The hot billing system collects the CDR from the related device (MSC in the CS domain, CG in the PS domain, or MDSP);
4. The hot billing system charges the user and performs appropriate actions on the user account.

To avoid impacts on the processing performance of a service network, in this mode, CDRs are not collected at a high frequency. In addition, the processing in the hot billing system takes some time, resulting in a certain charging delay. Because the hot billing system processes the balance only after the conversation is over and the CDR is generated, it is impossible to realize a real-time service control. The risk of arrearage is high.

SUMMARY OF THE INVENTION

One embodiment of the invention provides a charging system, which enables an online charging system and an offline charging system to stand alone from each other and converge in terms of functionality.

Another embodiment of the invention provides a charging method, providing two charging modes, namely, online charging and offline charging.

Another embodiment of the invention provides a charging method based on account sharing. In the charging method, an online charging system is connected to an offline charging system through a shared data center, so that both online charging and offline charging functions are provided.

Another embodiment of the invention provides a method for switching between prepaid and postpaid modes. The method realizes convergence of prepaid and postpaid modes and flexible switching between online charging and prepaid/postpaid mode.

Another embodiment of the invention provides a charging method binding voice and data services. The method enables bundled sales and preferences of voice and data services.

One embodiment of the invention provides a charging system, including: an operation support/customer service system, an online charging system, an offline charging system, a shared data center, and a service bearer network.

The operation support/customer service system provides a uniform user contact layer for users, adapted to update shared data in the shared data center; the online charging system is adapted to implement online hot billing for services; the offline charging system is adapted to implement offline charging by means of call detail record (CDR) collection and CDR processing; the shared data center is adapted to manage shared data and synchronize the shared data to the online charging system and the offline billing system, for access and use by the online billing system and the offline billing system; and the service bearer network performs data interactions with the online charging system and the offline charging system to complete charging triggering and service control.

Another embodiment of the invention provides a charging method, including:

Via an operation support/customer service system, configuring service data according to a user request and sending the service data to a shared data center;

Synchronizing, via the shared data center, the data to an online charging system and an offline charging system; and Processing, via the online charging system, service usage of the user in real time according to the service data; and processing, via the offline charging system, a call detail record (CDR) of the user according to the service data.

One embodiment of the invention provides a charging method based on account sharing, including:

Sending, via an operation support/customer service system, a Change Profile message to a shared data center, according to a Modify Profile request initiated by a user;

Synchronizing, via the shared data center, profile information to an online charging system;

Synchronizing, via the shared data center, profile information to an offline charging system; and Processing, via the online charging system or the offline charging system, charging and balance according to a user-defined account sharing rule.

Another embodiment of the invention provides a charging method supporting prepaid/postpaid switching, including:

Sending, via a user, a Change Payment Mode request to an operation support/customer service system;

Via the operation support/customer service system, authenticating the user and processing price change of the user based on user information according to the Change Payment Mode request initiated by the user;

Sending, via the operation support/customer service system, a Change Payment Mode message to a shared data center;

Sending a Change Payment Mode notification to a service bearer network simultaneously; and Modifying, via the service bearer network, the payment mode attribute of a product according to the Change Payment Mode notification.

Another embodiment of the invention provides a charging method binding voice and data services, including:

Sending, via an operation support/customer service system, configuration information of a binding scheme to a shared data center;

Sending, via the shared data center, configuration information of the binding scheme to an offline charging system and an online charging system, respectively; and Performing, via the online charging system, ratings and deductions according to the binding scheme and the user's order information; and processing, via the offline charging system, the binding scheme according to collected CDRs.

According to an embodiment of the invention, an online charging system and an offline charging system are connected via a shared data center to form an organic dual-engine structure. This dual-engine structure, based on interconnection of an online charging system and an offline charging system via a shared data center, is able to fulfill online charging and offline charging functions. With the structure, an operator can reduce its cost of arrearage and increase its capability of control.

A charging method based on a dual-engine charging system, according to an embodiment of the invention, not only provides online charging and offline charging, but also makes the online charging system and the offline charging system two standalone components. The online charging system stands alone from service components. Hence, the invention avoids impacts of charging system flexibility on reliability and stability of service components, enables convergence of online charging and offline charging, and helps enhance the flexibility of a charging system and the stability of service components.

The charging method based on account sharing, according to an embodiment of the invention, operates on the basis of a dual-engine charging system. In this method, an online charging system is connected to an offline charging system via a shared data center. While both online charging and offline charging capabilities are provided, the construction cost and price-to-performance ratio are assured.

The method for switching between prepaid and postpaid modes, according to an embodiment of the invention, based on a dual-engine charging system, realizes the convergence of prepaid and postpaid modes. The flexible switching between prepaid and postpaid modes enhances the management capability of an operator. The online charging capability monitors service usage in real time, thus helping the operator mitigate the risk of arrearage.

The charging method binding voice and data services, according to an embodiment of the invention, enables bundled sales and preferences of voice and data services, helping enhance user experience and user loyalty. Powerful service binding is an attractive function. It enhances the competitiveness of an operator in the market and helps the operator secure old markets and develop new markets.

DETAILED DESCRIPTION OF THE INVENTION

The invention is hereinafter described in detail with reference to the embodiments and accompanying drawings.

One embodiment of the invention provides a charging system based on a dual-engine structure which combines an online charging system and an offline charging system organically via a shared data center. A charging system based on this structure not only provides two charging modes, namely, online charging and offline charging, but also realizes the convergence of online charging and offline charging, and the convergence of prepaid and postpaid modes, ultimately resolving the binding of voice and data services. In addition, the online charging system and the offline charging system are standalone components. The online charging system stands alone from service components. Hence, the invention avoids impacts of charging system flexibility on reliability and stability of service components and enables convergence of online charging and offline charging, switching between prepaid and postpaid modes, and binding of voice and data services.

Figure 1:
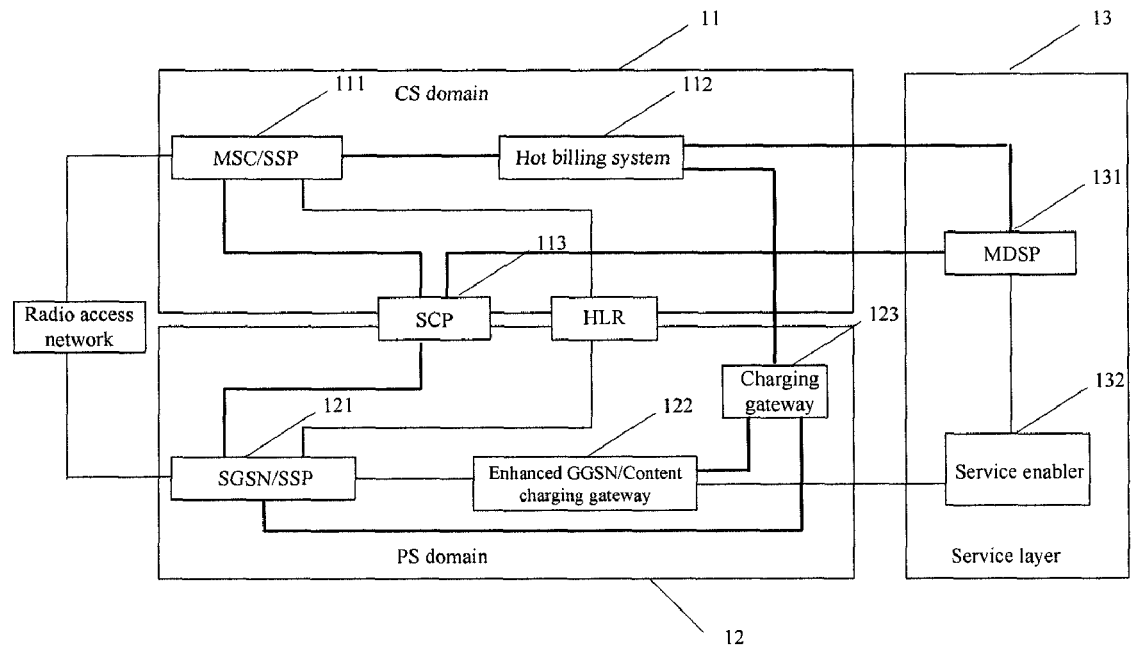
FIG. 1 illustrates the structure of a charging system.
Figure 2:
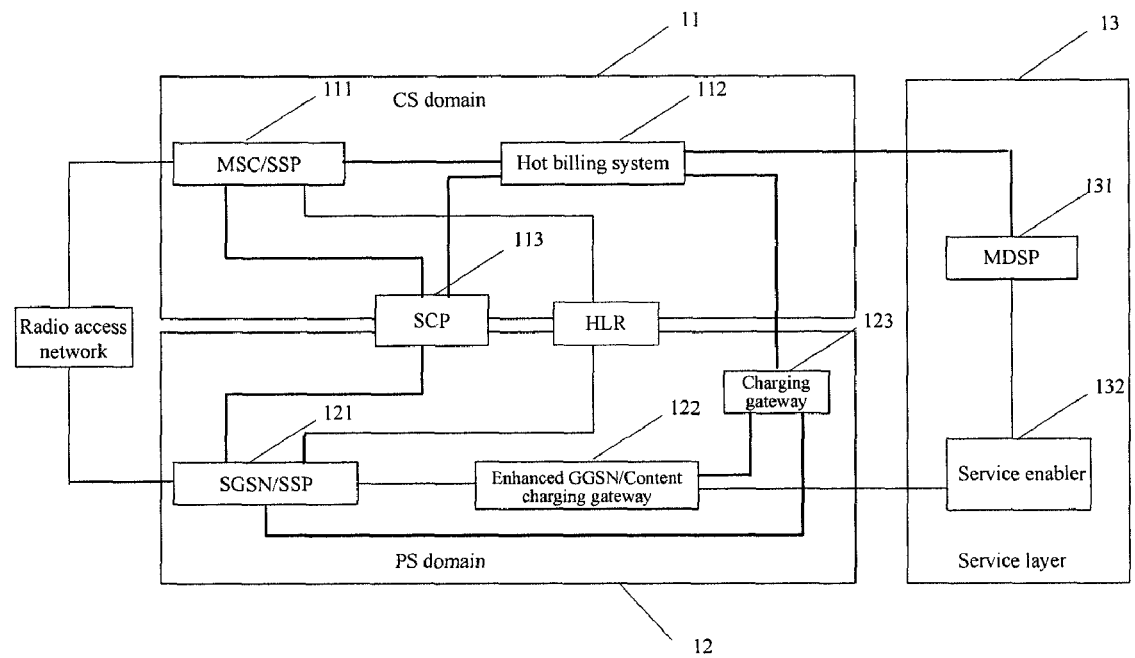
FIG. 2 illustrates the structure of another charging system.
Figure 3:
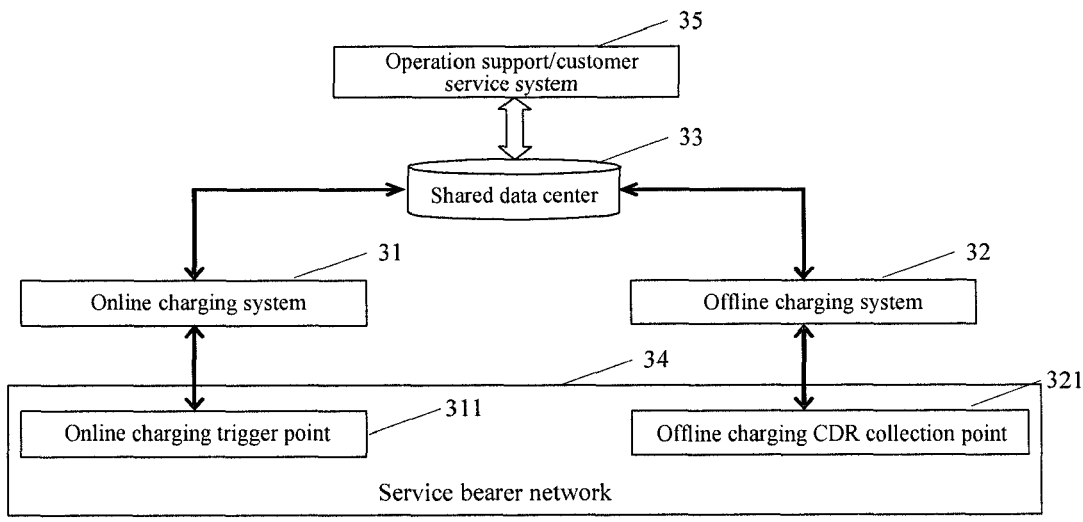
FIG. 3 illustrates the dual-engine structure of a charging system, according to an embodiment of the invention.

FIG. 3 illustrates the dual-engine structure of a charging system, according to an embodiment of the invention. As shown in FIG. 3, the charging system in an embodiment of the invention includes: an online charging system 31, an offline charging system 32, a shared data center 33, a service bearer network 34, and an operation support/customer service system 35. The online charging system 31 is adapted to implement online hot billing for services and implements real-time service control through an online charging trigger point 311; the offline charging system 32 is adapted to implement offline charging by preprocessing CDRs collected by an offline charging CDR collection point 321; the shared data center 33 is adapted to manage shared data for access and use by the online charging system 31 and the offline charging system 32; the service bearer network 34 performs data interactions with the online charging system 31 and the offline charging system 32 to complete charging triggering and service control; the operation support/customer service system 35 is adapted to provide operation management functions and offer a uniform user contact layer for users.

Figure 4:
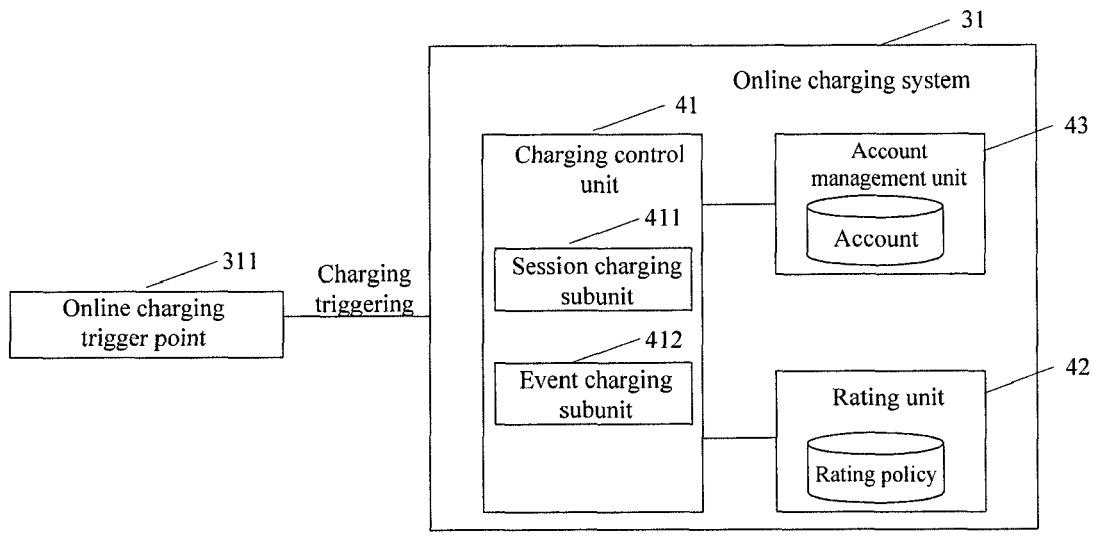
FIG. 4 illustrates the structure of an online charging system in a charging system, according to an embodiment of the invention.

FIG. 4 illustrates the structure of an online charging system in a charging system, according to an embodiment of the invention. As shown in FIG. 4, the main function of the online charging system 31 is to implement online hot billing for services and work with an online charging trigger point to control services in real time. The online charging system includes a charging control unit 41, a rating unit 42 and an account management unit 43. The charging control unit 41 implements actions of authorization/authentication, charging, reservation and deduction by invoking the rating unit 42 and the account management unit 43. The charging control unit 41 includes a session charging subunit 411 and an event charging subunit 412. The session charging subunit 411 implements online bearer control in real time based on the account balance. When the balance of a user account becomes 0, the session charging subunit 411 implements real-time control so that the user is unable to use services. The event charging subunit 412 performs ratings according to charging information of a current event and then posts expense items to a user account. The account management unit 43 interacts with the charging control unit 42. The account management unit 43 manages account balances according to user account information, requested credit line and action type (reservation, deduction, unfreeze or refund) provided by the charging control unit 41, thus enabling balance query, and reservation, deduction, unfreezing, and refund of a usable amount. The rating unit 42 processes ratings according to charging requests sent by the charging control unit 41. A charging request may include usage information, price information, and related charging parameters of a service. The rating unit 42 obtains the charge or usable amount for the service according to a rating policy.

Figure 5:
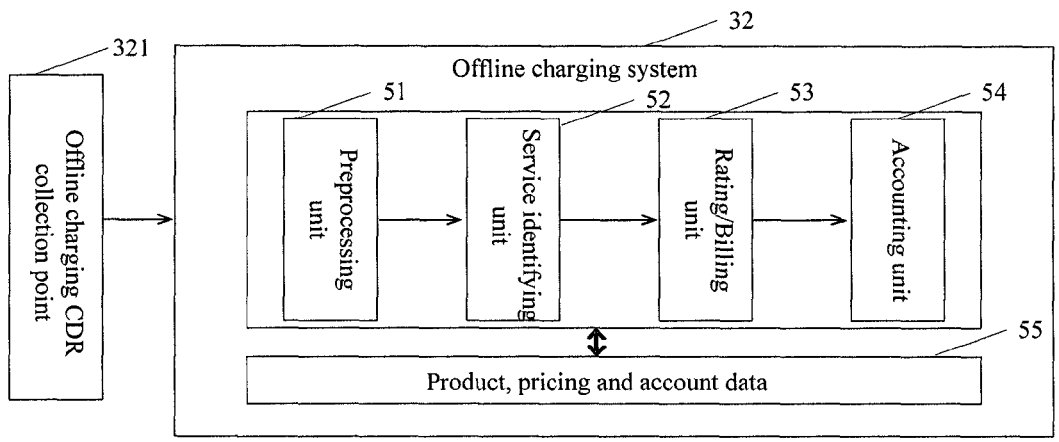
FIG. 5 illustrates the structure of an offline charging system in a charging system, according to an embodiment of the invention.

FIG. 5 illustrates the structure of an offline charging system in a charging system according to an embodiment of the invention. As shown in FIG. 5, the offline charging system 32 includes a preprocessing unit 51, a service identifying unit 52, a rating/charging unit 53 and an accounting unit 54. The offline charging system 32 mainly implements non-real-time offline charging. The offline charging system collects CDRs from all offline charging CDR collection points 321, processes the CDRs, and completes posting of accounts. The offline charging system 32 implements CDR collection and preprocessing, service identification, rating according to charging resource, user information and product information, generation of bill data, and posting of accounts. The preprocessing unit 51 mainly implements format conversion, record consolidation, and error detection/correction for collected CDRs. The service identifying unit 52 identifies the type of a service according to a CDR. The rating/charging unit 53 calculates charges based on preprocessed CDRs according to identification information, such as charging resource, price, user profile, and product information. The accounting unit 54 completes posting of accounts and generates bills according to the calculation result of the rating/charging unit 53.

Figure 6:
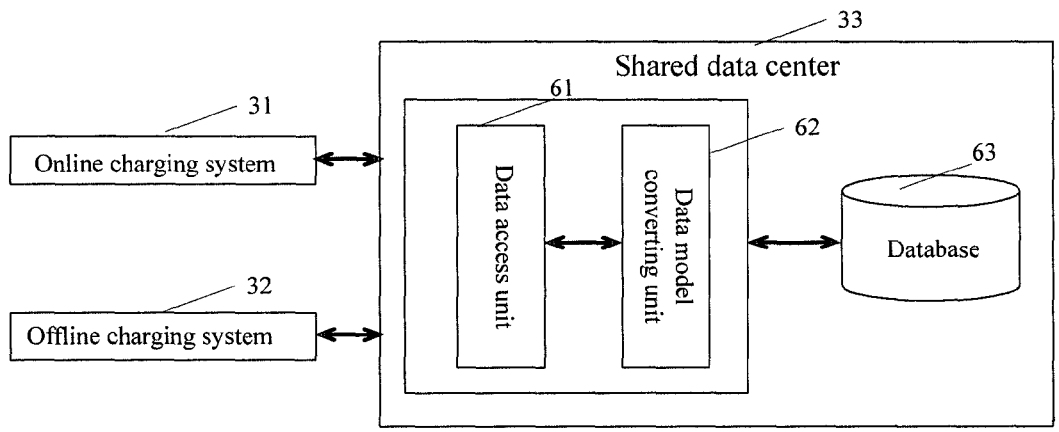
FIG. 6 illustrates the structure of a shared data center in a charging system, according to an embodiment of the invention.

FIG. 6 illustrates the structure of a shared data center in a charging system according to an embodiment of the invention. The shared data center 33 mainly manages shared data. The shared data center 33 builds data models of user, product, pricing and accounting, creates shared information data based on uniform data models, and sets up information management and sharing mechanisms, such as a right matrix for creation, access, and update of data. When data is created in the shared data center 33, the online charging system 31 and the offline charging system 32 can obtain the data for use. As shown in FIG. 6, the shared data center includes a data access unit 61, a data model converting unit 62, and a database 63. The data access unit 61 implements data update and interactions with the online charging system 31 and the offline charging system 32. If the online charging system 31, offline charging system 32 and shared data center 33 have different data models, the data model converting unit 62 implements the conversion between different data models. The database 63 stores user data, product data, and pricing data. The shared data center 33 may contain the following data:

(1) User Data

To ensure the convergence of prepaid and postpaid charging processing, all data in the user domain must be managed in the shared data center in a uniform manner. Change of user data is directly effective on the shared data center 33, and the changed data can be accessed and used by the online charging system 31 and the offline charging system 32. User data may include user information, user group information, and product instances and attributes.

(2) Product Data

To enable prepaid and postpaid users to use common products and mutual switching between prepaid and postpaid modes, product data needs to be created in the shared data center 33 directly by related systems, and accessed and used by the online charging system 31 and the offline charging system 32. Product data may include products, product attributes, and product charging event type.

(3) Pricing Data

To enable prepaid and postpaid users to enjoy identical pricing and mutual switching between prepaid and postpaid modes, pricing data is directly created in the shared data center 33, and accessed and used by the online charging system 31. Pricing data may include pricing policy, price standard, preference calculation, user pricing information, product pricing information, and pricing parameters.

(4) Balance Data

By means of target user, a balance book may be used by prepaid users, used commonly by the prepaid users and postpaid users, or used by the postpaid users. To ensure mutual switching between prepaid and postpaid modes, all balance book information and balance usage rules must be managed in the shared data center 33 on a uniform basis. Balance data includes balance book, rules such as special fund for special purpose and book sharing, balance data, and balance expenditure records.

(5) Charging Parameter Data

Charging parameters are reference data based on the cross preferences between prepaid users and postpaid users, mainly accumulative quantity data. For example, a prepaid user needs to obtain necessary related accumulative quantity data of a postpaid user from the shared data center 33.

In addition, the shared data center 33 needs to store related accumulative quantity data of a prepaid user that is necessary for a postpaid user.

According to an embodiment of the invention, the service bearer network 34 includes an online charging trigger point 311, an offline charging CDR collection point 321, and other network devices. The online charging trigger point 311 interacts with the online charging system 31 in real time to implement online charging and control when a user is using an online service. The offline charging CDR collection point 321 generates a CDR when a user finishes using a non-real-time service. Then, the offline charging system 32 collects the CDR and carries out subsequent charging processing. The service bearer network 34 may be a fixed network or a mobile network. The service bearer network 34 also includes related service bearer network devices, such as a Smart Home Location Register (SHLR) in a fixed network, a Home Location Register (HLR) in a mobile network, and a MDSP or components fulfilling similar functions. It should be noted that, according to an embodiment of the invention, components of the service bearer network 34 have no charging related functions, such as rating. These functions are implemented by a dual-engine structure made up of an online charging system, an offline charging system, and a shared data center.

According to an embodiment of the invention, the operation support/customer service system 35 in a charging system mainly provides operation management functions, offering a uniform user contact layer for users. The operation support/customer service system 35 implements multiple management functions, such as product management, user management, and partner management.

Figure 7:
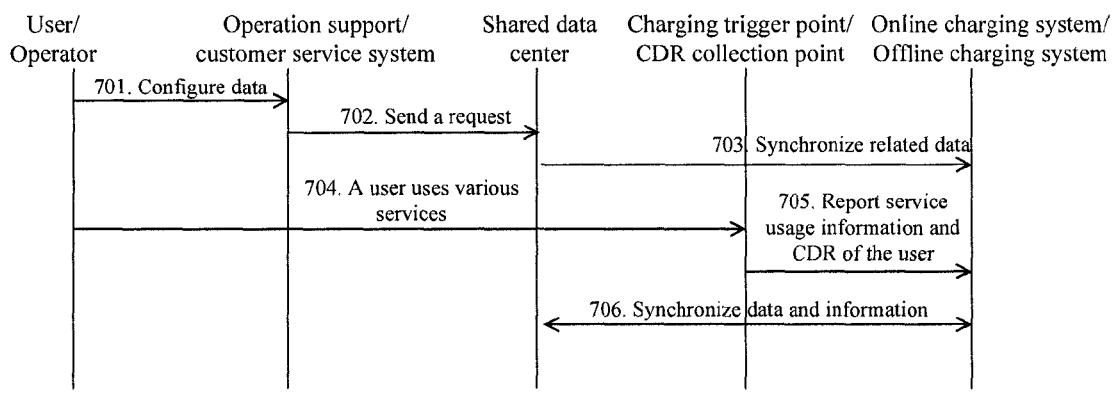
FIG. 7 illustrates the procedure of a charging method, according to an embodiment of the invention.

FIG. 7 illustrates the procedure of a charging method according to an embodiment of the invention. The method includes the following steps:

701. Through an operation support/customer service system, an operator may configure all kinds of data, for example, set a binding scheme and modify a user profile; a user may buy a service and request to modify profile information, for example, buy a bound service, define a shared account, or request change of payment mode.

702. The operation support/customer service system forwards the user or operator a request to a shared data center to update corresponding data.

703. The shared data center synchronizes the data needing to be updated to an online charging system and an offline charging system, respectively.

704 and 705. The user uses various services: if a service in use requires online charging, an online charging trigger point reports the usage information to the online charging system in real time; if a service in use requires offline charging, after the user finishes using the service, an offline charging CDR collection point sends a CDR to the offline charging system.

706. The online charging system processes service usage information in real time; the offline charging system processes the CDR. During the processing, if necessary, the online charging system and the offline charging system synchronize various data and information via the shared data center.

Figure 8:
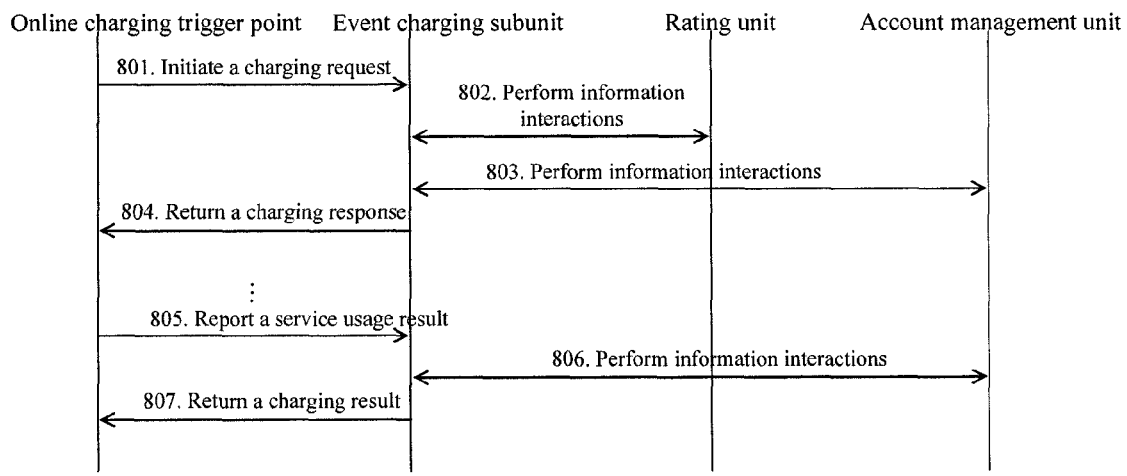
FIG. 8 illustrates an event based online charging procedure, according to an embodiment of the invention.

For a specific service, the above procedure may vary. FIG. 8 illustrates an online charging procedure based on events, including:

801. When a user begins to use a service, an online charging trigger point sends a charging request to an event charging subunit.

802. The event charging subunit interacts with a rating unit. After the event charging subunit identifies the service, the event charging subunit sends a price request to the rating unit; the rating unit calculates a price for the specified service according to the service and user information in the price request, and sends the price back to the event charging subunit.

803. The event charging subunit interacts with an account management unit. The event charging subunit invokes the account management unit, according to the price returned by the rating unit to perform reservation and deduction actions on the user account.

804. The event charging subunit sends a charging response to the online charging trigger point. If the user account balance is insufficient, the response message indicates reservation/deduction failure.

805. When the user finishes using the service, the online charging trigger point reports a service usage result (success or failure) to the event charging subunit.

806. The event charging subunit interacts with the account management unit. The event charging subunit invokes the account management unit to confirm the deduction from, or refund to, the user account, according to the service usage result.

807. The event charging subunit sends a charging result to the online charging trigger point.

Figure 9:
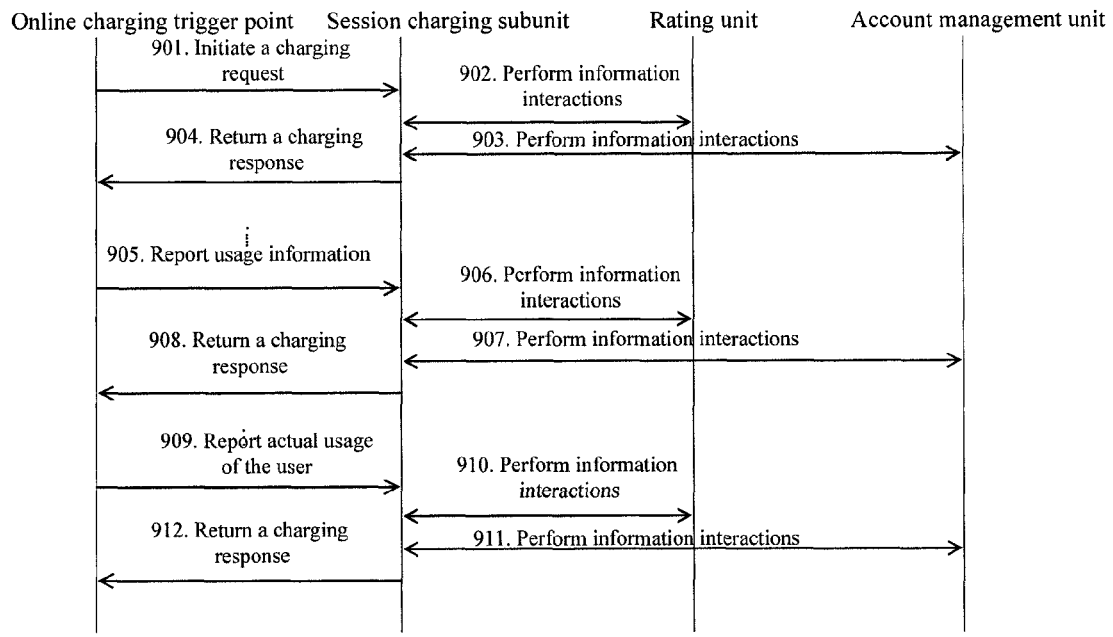
FIG. 9 illustrates a session based online charging procedure, according to an embodiment of the invention.

FIG. 9 illustrates an online charging procedure based on sessions, including:

901. When a user begins to use a service, an online charging trigger point sends a charging request to a session charging subunit.

902. The session charging subunit sets up and maintains a session; the session charging subunit interacts with a rating unit; the rating unit determines a reserved duration or traffic quantity according to service information, and sends the reserved quantity and price information to the session charging subunit.

903. The session charging subunit interacts with an account management unit; and the session charging subunit invokes the account management unit to make a reservation in the user account according to the rating result.

904. The session charging subunit sends a charging response to the online charging trigger point.

905. If the user account balance is insufficient, the response message indicates reservation failure; when the user is using the service, that is, during the service session, the online charging trigger point is required to report usage information to the session charging subunit when the reserved quantity is depleted.

906. The session charging subunit interacts with the rating unit. The rating unit determines the next reserved duration or traffic quantity according to service information, and sends the reserved quantity and price information back to the session charging subunit.

907. The session charging subunit interacts with the account management unit; the session charging subunit invokes the account management unit to confirm a deduction, and makes a subsequent reservation in the user account according to the rating result.

908. The session charging subunit sends a charging response to the online charging trigger point.

909. If the user account balance is insufficient, the response message indicates failure; when the user finishes using the service, the online charging trigger point reports actual usage information of the user to the session charging subunit.

910. The session charging subunit interacts with the rating unit. The session charging subunit invokes the rating unit to perform rating, according to the received actual usage information to get a price for the actual usage.

911. The session charging subunit interacts with the account management unit. The session charging subunit invokes the account management unit to confirm a deduction or refund the user account, according to the rating result.

912. The session charging subunit sends a charging response to the online charging trigger point.

Account sharing embodies the convergence of online charging and offline charging. Account sharing denotes that multiple products share an account. A shared account may help improve user experience. Types of account sharing include: account sharing between prepaid products, account sharing between products of different payment modes, and account sharing inside a corporate user, as well as account sharing between hot-billed fixed products and online-charged mobile products. Account sharing may be uniformly implemented by an online charging system, or separately implemented by an online charging system and an offline charging system.

Figure 10:
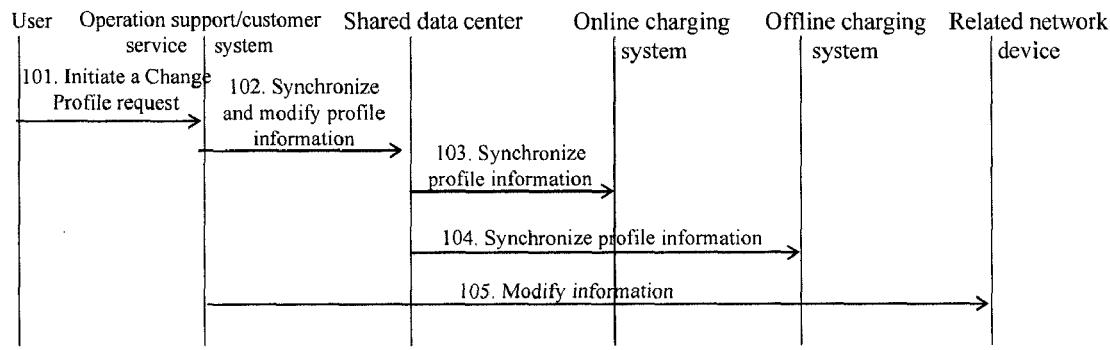
FIG. 10 illustrates the procedure for defining a shared account in a charging method, according to an embodiment of the invention.

FIG. 10 illustrates the procedure for defining a shared account in a charging method according to an embodiment of the invention. A shared account is defined by a user to set payment relationships through various portals provided by an operator. As shown in FIG. 10, the procedure for defining a shared account includes:

101. A user sends a Change Profile request through an operation support/customer service system.

102. The operation support/customer service system synchronizes profile information to a shared data center;

103. The shared data center synchronizes profile information to an online charging system.

104. The shared data center synchronizes profile information to an offline charging system.

105. For profile modification relating to a corporate virtual private network (VPN), the operation support/customer service system modifies corporate VPN information in related service bearer network devices (such as SCP) through a service provisioning interface.

The use of a shared account is a process in which, when a user is using a service, the charging system carries out related account processing, according to a user-defined account sharing rule in the profile information.

Figure 11:
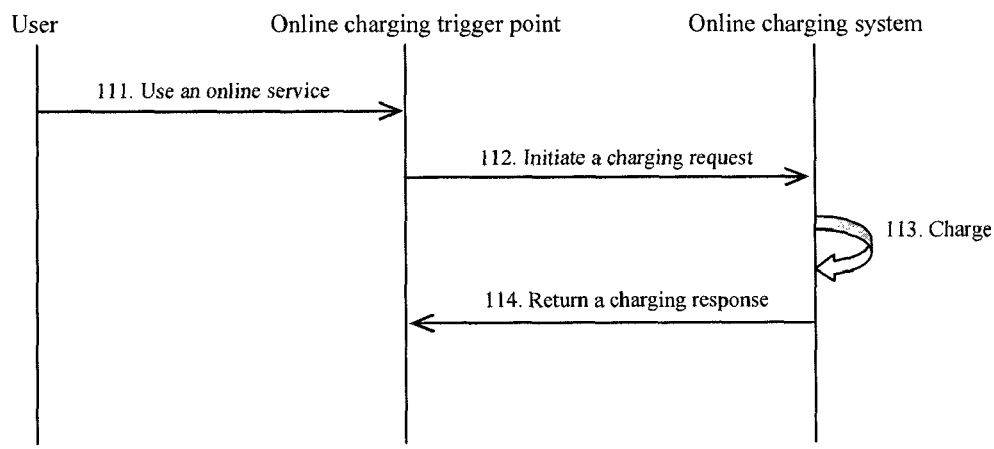
FIG. 11 illustrates the procedure for processing online services uniformly via an online charging system for a shared account, according to an embodiment of the invention.
Figure 12:
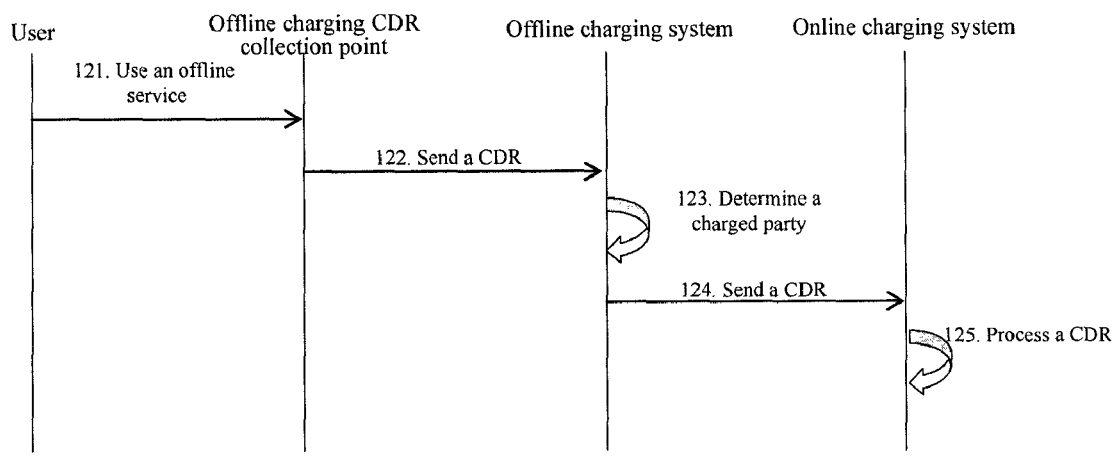
FIG. 12 illustrates the procedure for processing offline services uniformly via an online charging system for a shared account, according to an embodiment of the invention.

FIG. 11 and FIG. 12 are two uniform processing procedures in an online charging system when a shared account is in use. FIG. 11 illustrates the procedure for processing online services uniformly by an online charging system for a shared account according to an embodiment of the invention. The procedure includes:

111. A user uses an online service.

112. An online charging trigger point sends charging information of the user through a charging request to an online charging system.

113. The online charging system charges the user, according to the user's order information and a charging rule, and performs reservation and deduction actions on the user account. This step is the same as in a normal online charging procedure.

114. The online charging system sends a charging response to the online charging trigger point.

When services are processed uniformly for a shared account, the procedure for using online services is the same as a normal online service procedure, during which several real-time reservations and deductions may happen.

FIG. 12 illustrates the procedure for processing offline services uniformly via an online charging system for a shared account, according to an embodiment of the invention. The procedure includes:

121. A user uses an offline service.

122. After the user finishes using the service, an offline charging CDR collection point sends a CDR to an offline charging system.

123. The offline charging system determines the charged party and sends the CDR to the online charging system if the CDR is to be processed by an online charging system; otherwise, the offline charging system processes the CDR.

124. The offline charging system sends the CDR to the online charging system for processing.

125. The online charging system processes the CDR, posting the shared account according to an account balance shared with online charging.

Figure 13:
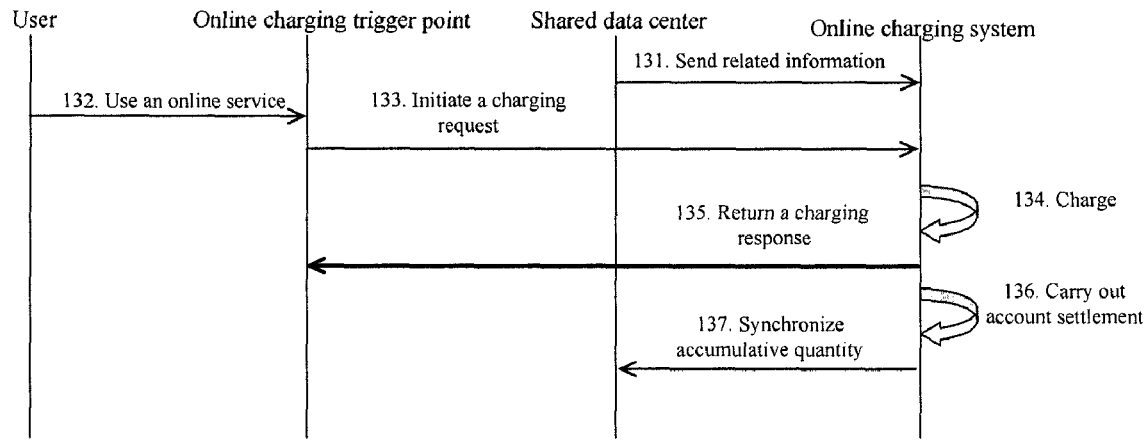
FIG. 13 illustrates the procedure for processing online services via an online charging system for a shared account, according to an embodiment of the invention.
Figure 14:
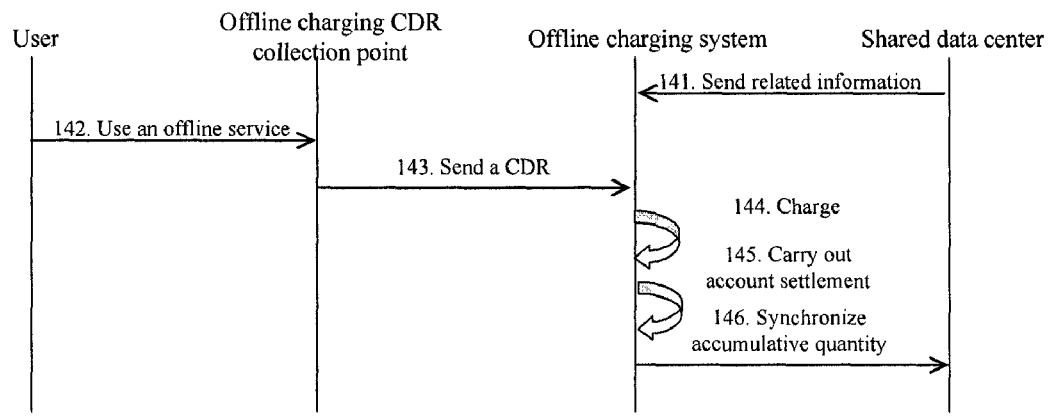
FIG. 14 illustrates the procedure for processing offline services via an offline charging system for a shared account, according to an embodiment of the invention.

FIG. 13 and FIG. 14 are procedures in which an online charging system and an offline charging system process shared accounts separately. FIG. 13 illustrates the procedure for processing online services by an online charging system for a shared account according to an embodiment of the invention. The procedure includes:

131. An online charging system requests a certain account balance from a shared data center, including related accumulative quantity information and price related accumulative quantity in the last accounting period.

132. A user uses an online service.

133. An online charging trigger point sends charging information of the user through a charging request to the online charging system.

134. The online charging system charges the user according to the user's order information and a charging rule, and performs reservation and deduction actions on the user account. When the requested balance amount is insufficient, the online charging system sends another request to the shared data center.

135. The online charging system sends a charging response to the online charging trigger point.

136. When an accounting period ends, the online charging system carries out account settlement and stores the accumulative quantity at the time point.

137. The online charging system synchronizes the accumulative quantity at the end of the accounting period to the shared data center for use by other systems.

FIG. 14 illustrates the procedure for processing offline services via an offline charging system for a shared account according to an embodiment of the invention. The procedure includes:

141. An offline charging system requests a certain account balance from a shared data center, including related accumulative quantity information and price related accumulative quantity in the last accounting period.

142. A user uses an offline service.

143. After the user finishes using the service, an offline charging CDR collection point generates a CDR and sends the CDR to the offline charging system.

144. The offline charging system carries out charging processing on the CDR and responds to the local balance. When the balance is insufficient, the offline charging system sends another request to the shared data center.

145. When an accounting period ends, the offline charging system carries out account settlement and stores the accumulative quantity at the time point.

146. The offline charging system synchronizes the accumulative quantity at the end of the accounting period to the shared data center for use by other systems.

In the above charging procedures for shared accounts, accumulative quantity information, such as an account balance, may be queried, as necessary. The procedure for querying a shared account includes: (1) a user sends a balance query request through an operation support/customer service system; (2) the operation support/customer service system sends a query request to a shared data center; (3) if the account queried relates to an online charging system, the shared data center sends a query request to the online charging system, and the online charging system returns account balance information to the shared data center; (4) if the account queried relates to an offline charging system, the shared data center sends a query request to the offline charging system, and the offline charging system returns account balance information to the shared data center; (5) the shared data center adds up balances in the online charging system, offline charging system, and a local database of the shared data center, and sends balance information to the operation support/customer service system; and (6) the operation support/customer service system sends queried information to the user.

Figure 15:
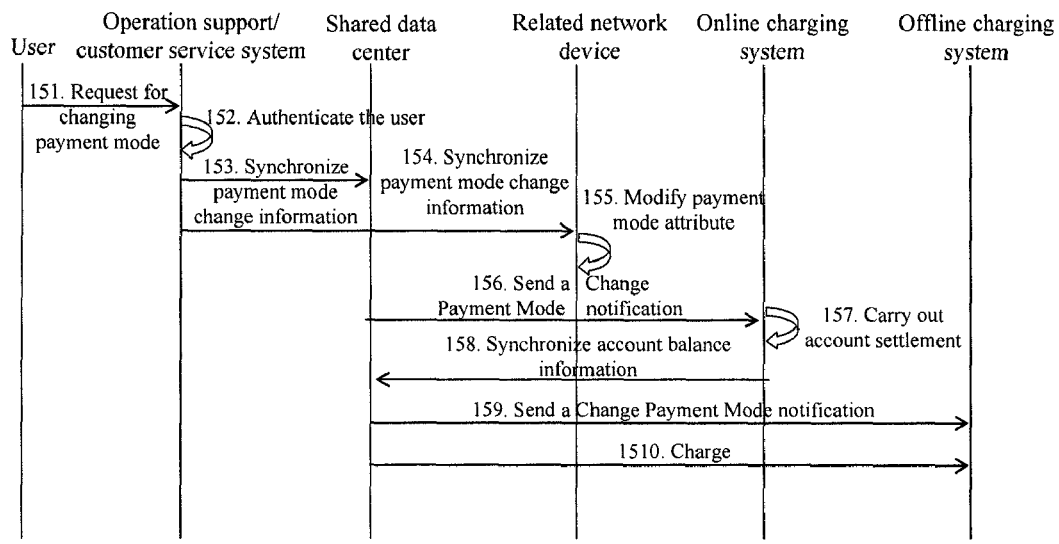
FIG. 15 illustrates the procedure for switching from prepaid mode to postpaid mode in a charging method, according to an embodiment of the invention.

Switching between prepaid and postpaid modes is also an embodiment of the convergence of offline charging and online charging. Switching from prepaid mode to postpaid mode indicates that a user changes the payment mode for services from prepaid to postpaid through a portal provided by an operator. A request for switching from postpaid mode to prepaid mode may be initiated by a user or by an operator, according to the credit line of the user. FIG. 15 illustrates the procedure for switching from prepaid mode to postpaid mode, according to an embodiment of the invention. The procedure includes:

151. A user sends a request for changing from prepaid mode to postpaid mode for one or more ordered product instances to an operation support/customer service system.

152. The operation support/customer service system authenticates the user and changes the price according to user information. The operation support/customer service system audits the Change Payment Mode request and, if the change of payment mode relates to a price change, for example, some preferences are only available for prepaid users, the operation support/customer service system changes the price and notifies the user.

153. The operation support/customer service system synchronizes payment mode change information to a shared data center.

154. The operation support/customer service system also needs to send the Change Payment Mode notification to a related network device. This network device is determined by the specific product instance, for example, a HLR related to the change of voice services, a MDSP related to the change of data services, or a related service bearer network.

155. The network device modifies the payment mode attribute of the product from prepaid to postpaid, according to the Change Payment Mode notification.

156. The shared data center sends a Change Payment Mode notification to an online charging system.

157. The online charging system carries out account settlement for the related product instance, including freezing account balance, waiting for end of the current session, and stopping the product instance from receiving service.

158. The online charging system synchronizes the related account balance (including an accumulative quantity) to the shared data center for use by an offline charging system.

159. The shared data center sends a Change Payment Mode notification to the offline charging system, requesting the offline charging system to continue processing the related product instance.

1510. The offline charging system gets the profile information from the shared data center sent by the online charging system and continues with related charging processing.

Figure 16:
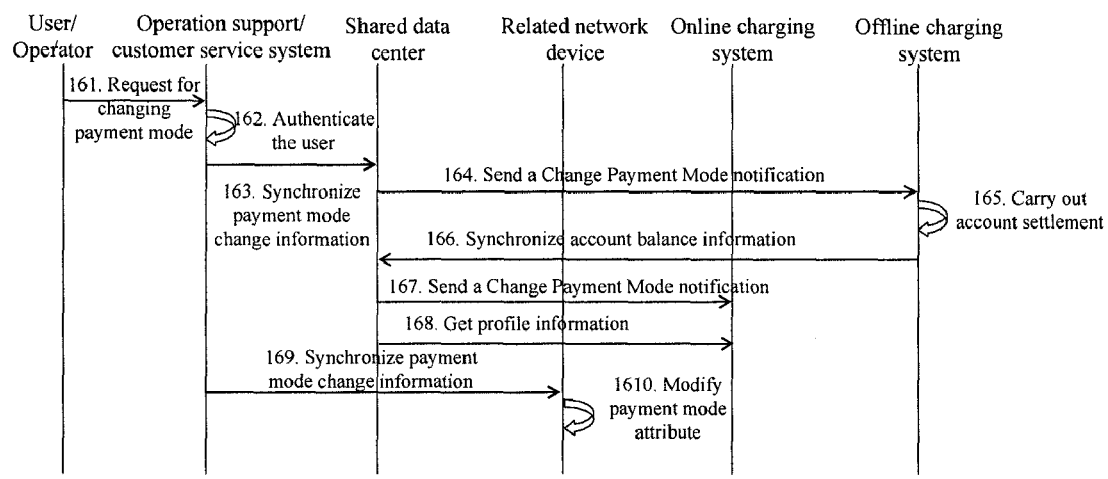
FIG. 16 illustrates the procedure for switching from postpaid mode to prepaid mode in a charging method, according to an embodiment of the invention.

FIG. 16 illustrates the procedure for switching from postpaid mode to prepaid mode, according to an embodiment of the invention. The procedure includes:

161. A user or operator initiates a Change Payment Mode notification. The user can change the payment mode from postpaid to prepaid. The operator can switch a user from postpaid mode to prepaid mode, according to the credit line of the user.

162. The operation support/customer service system authenticates the user and changes the price according to user information. The operation support/customer service system audits the Change Payment Mode request and, if the change of payment mode relates to a price change, for example, some preferences are only available for postpaid users, the operation support/customer service system changes the price and notifies the user.

163. The operation support/customer service system synchronizes payment mode change information to a shared data center.

164. The shared data center sends a Change Payment Mode notification to an offline charging system, indicating that the user wants to change the payment mode of the product instance from postpaid to prepaid.

165. The offline charging system carries out account settlement for the related product instance, including freezing the related account balance.

166. The offline charging system synchronizes the related account balance (including an accumulative quantity) to the shared data center for use by the online charging system.

167. The shared data center sends a Change Payment Mode notification to the online charging system, requesting the online charging system to continue processing the product instance.

168. The online charging system gets the profile information from the shared data center sent by the offline charging system, and continues with related charging processing.

169. The operation support/customer service system also needs to send the Change Payment Mode notification to a related network device. This network device is determined by the specific product instance, for example, a HLR related to the change of voice services, a MDSP related to the change of data services, or a related service bearer network.

1610. The network device modifies the payment mode attribute of the product from postpaid to prepaid according to the Change Payment Mode notification.

Figure 17:
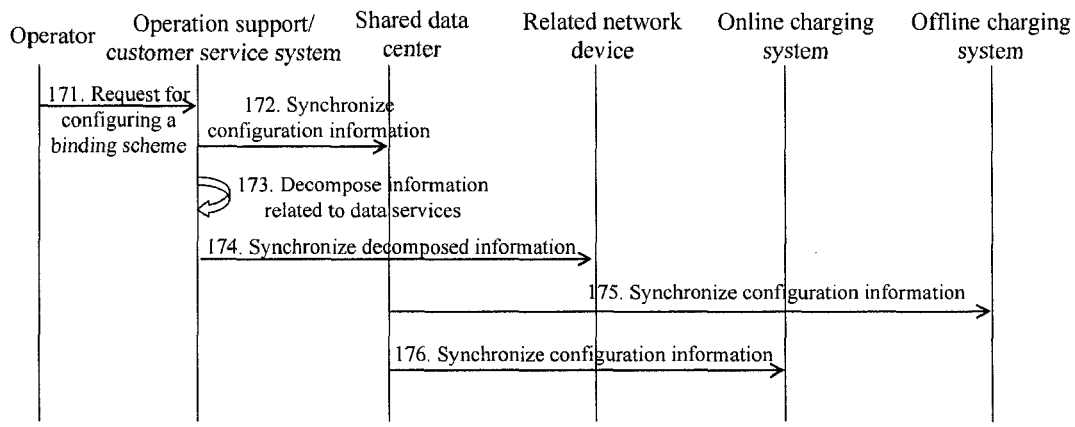
FIG. 17 illustrates the procedure for configuring a scheme binding voice and data services in a charging method, according to an embodiment of the invention.

The convergence of online charging and offline charging in the charging system provided, according to an embodiment of the invention, is also represented by binding of voice and data services. For example, a user obtains one minute local conversation time for free for each download of a song, which is the binding of voice and data services. The following describes the configuration, purchase, and usage of a binding scheme. FIG. 17 illustrates the procedure for configuring a scheme binding voice and data services in a charging method, according to an embodiment of the invention. The procedure includes:

171. An operator configures a binding scheme through an operation support/customer service system.

172. The operation support/customer service system synchronizes configuration information of the binding scheme to a shared data center for sharing with an online charging system and an offline charging system.

173. The operation support/customer service system decomposes a part related to data services from the binding scheme so as to send the part to a related device in the data domain (such as a MDSP) for processing. The operation support/customer service system should be able to distinguish which products are related to data services.

174. The operation support/customer service system sends the part related to data services to the related device (such as a MDSP) for display on the data domain portal.

175. The shared data center synchronizes the configuration information of the binding scheme to the offline charging system.

176. The shared data center synchronizes the configuration information of the binding scheme to the online charging system.

A user may order a binding scheme through the operation support/customer service system; the operation support/customer service system synchronizes order information of the binding scheme to a related device in the data domain (such as a MDSP); the operation support/customer service system synchronizes order information of the binding scheme to the shared data center; the shared data center synchronizes order information of the binding scheme to the online charging system so that the online charging system can execute a pricing rule corresponding to the binding scheme during charging processing; and the shared data center synchronizes order information of the binding scheme to the offline charging system so that the offline charging system can execute a pricing rule corresponding to the binding scheme during charging processing.

When the user is using online services, different online charging trigger points obtain service usage information of the user, according to the type of service in use. The online charging trigger points send a charging request to the online charging system and transfers charging information to the online charging system. The online charging system carries out rating and deduction processing, according to the related binding scheme and user order information. The specific binding scheme is implemented by the online charging system. The online charging system sends the rating and deduction result to the online charging trigger points. The offline charging system processes the binding scheme, according to collected CDRs.

Figure 18:
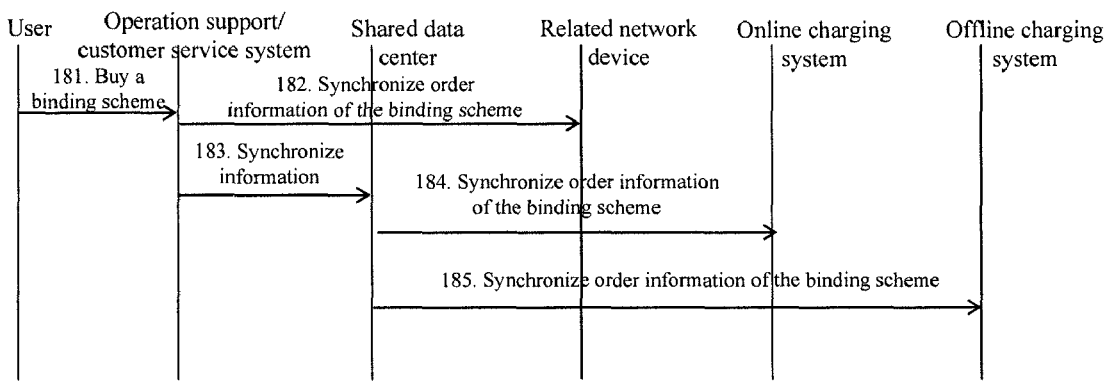
FIG. 18 illustrates the procedure for buying a binding scheme via a user, according to an embodiment of the invention.

FIG. 18 illustrates the procedure for purchasing a binding scheme by a user, according to an embodiment of the invention. The procedure includes:

181. A user purchases a binding scheme provided by an operator.

182. An operation support/customer service system synchronizes order information of the binding scheme to a related device in the data domain (such as a MDSP).

183. The operation support/customer service system synchronizes order information of the binding scheme to a shared data center.

184. The shared data center synchronizes order information of the binding scheme to an online charging system so that the online charging system can execute a pricing rule corresponding to the binding scheme during charging processing.

185. The shared data center synchronizes order information of the binding scheme to an offline charging system so that the offline charging system can execute a pricing rule corresponding to the binding scheme during charging processing.

Figure 19:
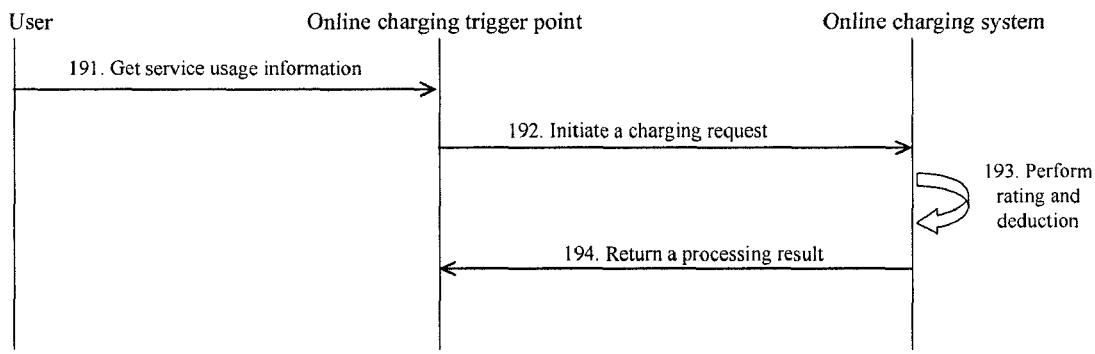
FIG. 19 illustrates the procedure for using a binding scheme via a user, according to an embodiment of the invention.

FIG. 19 illustrates the procedure for using a binding scheme by a user according to an embodiment of the invention. In the embodiment of the invention, an online charging system processes the binding scheme. An offline charging system processes the binding scheme according to collected CDRs. As shown in FIG. 19, the procedure includes:

191. When a user is using online services, different online charging trigger points get service usage information of the user according to the type of service in use.

192. The online charging trigger points send a charging request to an online charging system and transfer charging information to the online charging system.

193. The online charging system carries out rating and deduction processing according to the binding scheme and the user's order information. The specific binding scheme is implemented via the online charging system.

194. The online charging system sends the rating and deduction result to the online charging trigger points.

In a word, according to embodiments of the invention, a charging system is a dual-engine structure made up of an online charging system and an offline charging system organically connected via a shared data center. This dual-engine structure, based on interconnection of an online charging system and an offline charging system via a shared data center, is able to complete online charging and offline charging functions. It helps an operator reduce the cost of arrearage and increase the capability of control.

A charging method based on a dual-engine charging system, according to an embodiment of the invention, not only provides online charging and offline charging, but also makes the online charging system and the offline charging system two standalone components. The online charging system stands alone from service components. Hence, the invention avoids impacts of charging system flexibility on the reliability and stability of service components, realizes convergence of online charging and offline charging, and helps enhance the flexibility of a charging system and the stability of service components.

A charging method based on account sharing according to an embodiment of the invention operates on the basis of a dual-engine charging system. An online charging system is connected to an offline charging system via a shared data center. While both online charging and offline charging capabilities are provided, the construction cost and price-to-performance ratio are assured.

The method for switching between prepaid and postpaid modes according to an embodiment of the invention, based on a dual-engine charging system, realizes the convergence of prepaid and postpaid modes. The flexible switching between prepaid and postpaid modes enhances the management capability of an operator. The online charging capability monitors service usage in real time, thus helping the operator mitigate the risk of arrearage.

A charging method binding voice and data services, according to an embodiment of the invention, enables bundled sales and preferences of voice and data services, helping enhance user experience and user loyalty. Powerful service binding is an attractive function. It enhances the competitiveness of an operator in the market, and helps the operator secure old markets and develop new markets.

Although the invention has been described through some exemplary embodiments, the invention is not limited to such embodiments. It is apparent that those skilled in the art can make various modifications and variations to the invention without departing from the spirit and scope of the invention. The invention is intended to cover the modifications and variations provided that they fall within the scope of protection defined by the following claims or their equivalents.

What is claimed is:

1. A charging system, comprising an online charging system, an offline charging system, and a shared data center in communication with the online charging system and the offline charging system, respectively, wherein the online charging system is configured to implement online hot billing for services according to shared data related charging including user data, product data, pricing data, balance data, and accumulative quantity data;

the online charging system comprises a charging control unit, an account management unit, and a rating unit;

the charging control unit is configured to invoke the rating unit and the account management unit, and to work with a service bearer network to complete charging related operations, according to the shared data related charging in the shared data center, when a user is using a service;

the account management unit is configured to manage account balances of the user according to user account information, requested credit line, and action type information provided by the charging control unit; and the rating unit is configured to rate according to a charging request sent by the charging control unit, and determine a charge or usable quantity according to a rating policy in the shared data center;

wherein the offline charging system is configured to implement offline charging by means of call detail record (CDR) collection, and CDR processing, according the shared data related charging;

the offline charging system comprises a preprocessing unit, a service identifying unit, a rating/charging unit, and an accounting unit;

the preprocessing unit is configured to implement format conversion, record consolidation, and error detection/correction for CDRs collected from the service bearer network;

the service identifying unit is configured to identify the type of a service, according to the CDRs;

the rating/charging unit is configured to calculate charges based on the preprocessed CDRs, according to the shared data related charging in the shared data center and identification information; and the accounting unit is configured to complete posting of accounts and to generate bills, according to calculation results of the rating/charging unit; and wherein the shared data center is configured to manage the shared data related charging and synchronize the shared data related charging to the online charging system and the offline charging system, for access and use by the online charging system and the offline charging system;

the shared data center comprises a data access unit, a data model converting unit, and a database;

the data access unit is configured to update the shared data related charging, and to interact with the online charging system and the offline charging system;

the data model converting unit is configured to implement conversion of different data between the database, and the online charging system or the offline charging system; and the database is configured to store the shared data related charging.

2. The charging system of claim 1, further comprising:
the service bearer network configured to interact with the online charging system, and the offline charging system to perform charging triggering and service control.

3. The charging system of claim 1, wherein the charging control unit of the online charging system comprises a session charging subunit and an event charging subunit; wherein:
the session charging subunit is configured to interact with the account management unit and the rating unit, respectively, to complete online bearer control in real time based on the account balance; and
the event charging subunit is configured to interact with the account management unit and the rating unit, respectively, to perform ratings according to charging information of a current event and post expense items to an account of the user.

4. The charging system of claim 2, wherein the service bearer network comprises an online charging trigger point and an offline charging CDR collection point; wherein:
the online charging trigger point is configured to interact with the online charging system in real time to implement online charging and control; and
the offline charging CDR collection point is configured to generate a CDR when a user is using an offline service, and provides the CDR for the offline charging system to carry out charging processing.

5. The charging system of claim 4, wherein the service bearer network is a fixed network or a mobile network.

6. A charging method based on account sharing, comprising:
receiving, by way of a shared data center having a processor, a Change Profile message sent by an operation support/customer service system;
synchronizing, by way of the shared data center having the processor, profile information to an online charging system; and
synchronizing, by way of the shared data center having the processor, profile information to an offline charging system;
Managing and updating the shared data related charging including user data, product data, pricing data, balance data, and accumulative quantity data;
Synchronizing the shared data related charging to the online charging system and the offline charging system, for access and use by the online charging system and the offline charging system;
implementing conversion of different data between the database, and the online charging system or the offline charging system; and
storing the shared data related charging;
wherein
the online charging system or the offline charging system performs charging and account processing, according to a user-defined account sharing rule in the profile information;
the online charging system implements online hotbilling for services according to shared data related charging including user data, product data, pricing data, balance data, and accumulative quantity data; manages account balances of the user according to user account information, requested credit line, and action type information provided by the charging control unit; and rates according to a charging request and determines a charge or usable quantity according to a rating policy in the shared data center;
the offline charging system implements offline charging by means of call detail record (CDR), collection, and CDR processing, according the shared data related charging;
implements format conversion, record consolidation, and error detection/correction for CDRs collected from a service bearer network; identifies the type of a service, according to the CDRs; calculates charges based on the preprocessed CDRs, according to the shared data related charging in the shared data center and identification information;
and completes posting of accounts and to generate bills, according to calculation results of the rating/charging unit.

7. The method of claim 6, wherein, if the online charging system processes shared accounts on a uniform basis when a user uses an offline service, processing via the offline charging system comprises:
sending, by way of an offline charging CDR collection point, a call detail record (CDR) to the offline charging system after the user finishes using the service;
determining, by way of the offline charging system, the charged party, and sending the CDR to the online charging system if the CDR is to be processed by the online charging system; otherwise, processing the CDR by the offline charging system; and
sending, by way of the offline charging system, the CDR to the online charging system for processing, where operations, such as posting of a shared account, are completed, according to an account balance shared with online charging.

8. The method of claim 6, wherein, if the online charging system and the offline charging system process share accounts separately, when the user uses an online service, processing by the online charging system comprises:
requesting and obtaining accumulative quantity information of an account from the shared data center;
receiving charging information of the user sent by an online charging trigger point;
charging the user according to the user's order information and a charging rule;
sending a charging response to the online charging trigger point; and
settling the account when an accounting period ends, storing an accumulative quantity at the end of the accounting period, and synchronizing the accumulative quantity to the shared data center.

9. The method of claim 6, wherein, if the online charging system and the offline charging system process shared accounts separately when the user uses an offline service, processing by the offline charging system comprises:

requesting and obtaining accumulative quantity information of an account from the shared data center;

receiving a CDR from an offline charging CDR collection point when the user finishes using the service;

carrying out charging processing on the CDR and responding to a local balance, and sending another request to the shared data center when the balance is insufficient; and settling the account when an accounting period ends, storing an accumulative quantity at the end of the accounting period, and synchronizing the accumulative quantity to the shared data center.

10. The method of claim 7, wherein, if the user attempts to query shared account information, the method further comprises:

receiving, by way of the shared data center, a query request; wherein the query request is sent by an operation support/customer service system when receiving a balance query request from the user;

sending, by way of the shared data center, the query request to the online charging system and receiving the account balance and accumulative quantity information from the online charging system, when the queried account relates to the online charging system; or sending, by way of the shared data center, a query request to the offline charging system and receiving account balance information from the offline charging system, when the queried account relates to the offline charging system;

adding up, by way of the shared data center, three balances, respectively, in the online charging system, the offline charging system, and a local database of the shared data center, and sending balance information to the operation support/customer service system.

\* \* \* \* \*